(12) United States Patent
Wang (10) Patent No.: US 12,169,974 B2
(45) Date of Patent: Dec. 17, 2024

(54) EFFICIENT REFINEMENT NEURAL NETWORK FOR REAL-TIME GENERIC OBJECT-DETECTION SYSTEMS AND METHODS

(71) Applicant: FLIR Unmanned Aerial Systems ULC, Vancouver (CA)

(72) Inventor: Jun Wang, Waterloo (CA)

(73) Assignee: FLIR Unmanned Aerial Systems ULC, Vancouver (CA)

(*) Notice: Subject to any disclaimer, the term of this patent is extended or adjusted under 35 U.S.C. 154(b) by 153 days.

(21) Appl. No.: 17/374,909

(22) Filed: Jul. 13, 2021

(65) Prior Publication Data

US 2022/0019843 A1   Jan. 20, 2022

Related U.S. Application Data

(60) Provisional application No. 63/051,823, filed on Jul. 14, 2020.

(51) Int. Cl.
*G06V 20/60* (2022.01)
*G06F 18/25* (2023.01)
(Continued)

(52) U.S. Cl.
CPC ............ *G06V 20/60* (2022.01); *G06F 18/253* (2023.01); *G06N 3/04* (2013.01); *G06N 3/08* (2013.01); *G06V 10/40* (2022.01)

(58) Field of Classification Search
CPC ........ G06V 20/60; G06V 10/40; G06V 10/82; G06F 18/253; G06F 18/213; G06N 3/04; G06N 3/08; G06N 3/045; G06N 3/084
See application file for complete search history.

(56) References Cited

U.S. PATENT DOCUMENTS

| | | | |
|---|---|---|---|
| 10,068,171 B2 | 9/2018 | Wshah et al. | |
| 2021/0027098 A1* | 1/2021 | Ge | G06F 18/217 |
| 2022/0230420 A1* | 7/2022 | Cheng | G06V 10/7715 |

FOREIGN PATENT DOCUMENTS

| | | |
|---|---|---|
| CN | 108846446 A | 11/2018 |
| CN | 109271960 A | 1/2019 |

(Continued)

OTHER PUBLICATIONS

Wang, Robert J., Xiang Li, and Charles X. Ling. "Pelee: A Real-Time Object Detection System on Mobile Devices." arXiv e-prints (2018): arXiv-1804.https://arxiv.org/abs/1804.06882 (Year: 2018).*

(Continued)

*Primary Examiner* — Wesley J Tucker
*Assistant Examiner* — Han Hoang
(74) *Attorney, Agent, or Firm* — Haynes and Boone, LLP (57) ABSTRACT

High resolution object detection systems and methods provide accurate, real-time, one-stage processing, and include a backbone network configured to receive an input image and generate multi-scale feature representations, a feature fusion block configured to fuse the multi-sale feature representations, a plurality of representation transfer modules configured to isolate and decouple sub-task networks and the multi-scale feature representations, and a cascade refinement module configured to process each representation transfer module output to refine predictions. The backbone network generates a plurality of image features corresponding to each of a plurality of image scales and includes a plurality of convolutional layers and a stem block after the first convolutional layer, wherein the stem block improves feature extraction performance. The feature fusion block generates feature outputs for each of a plurality of image scales.

18 Claims, 9 Drawing Sheets

(51) Int. Cl.
*G06N 3/04* (2023.01)
*G06N 3/08* (2023.01)
*G06V 10/40* (2022.01)

(56) References Cited

FOREIGN PATENT DOCUMENTS

| CN | 109344693 A | 2/2019 |
| IN | 2018/31036280 A | 10/2018 |
| WO | WO 2018/192023 A1 | 10/2018 |

OTHER PUBLICATIONS

Zhang, Xindi, Ebroul Izquierdo, and Krishna Chandramouli. "Dense and Small Object Detection in UAV Vision Based on Cascade Network." 2019 IEEE/CVF International Conference on Computer Vision Workshop (ICCVW). IEEE, 2019.https://ieeexplore.ieee.org/abstract/document/9022077 (Year: 2019).*

* cited by examiner

| Layer | Output size | PeleeNetV2-17 | PeleeNetV2-31 |
|---|---|---|---|
| Input | 336 x 336 | | |
| Stage 0 | 56 x 56 | Stem Block | |
| Stage 1 | 56 x 56 | DenseLayer(k=32) x 3 | DenseLayer(k=32) x 3 |
| Stage 1 | 56 x 56 | 1 x 1 conv, 128 | 1 x 1 conv, 128 |
| | 28 x 28 | 2 x 2 average pool, stride 2 | |
| Stage 2 | 28 x 28 | DenseLayer(k=32) x 4 | DenseLayer(k=48) x 8 |
| Stage 2 | 28 x 28 | 1 x 1 conv, 256 | 1 x 1 conv, 256 |
| | 14 x 14 | 2 x 2 average pool, stride 2 | |
| Stage 3 | 14 x 14 | DenseLayer(k=64) x 6 | DenseLayer(k=64) x 12 |
| Stage 3 | 14 x 14 | 1 x 1 conv, 640 | 1 x 1 conv, 512 |
| | 7 x 7 | 2 x 2 average pool, stride 2 | |
| Stage 4 | 7 x 7 | DenseLayer(k=64) x 4 | DenseLayer(k=64) x 8 |
| Stage 4 | 7 x 7 | 1 x 1 conv, 896 | 1 x 1 conv, 1024 |
| Classification Layer | 1 x 1 | 7 x 7 global average pool | |
| Classification Layer | | 1000 D fully-connecte, softmax | |

EFFICIENT REFINEMENT NEURAL NETWORK FOR REAL-TIME GENERIC OBJECT-DETECTION SYSTEMS AND METHODS

CROSS-REFERENCE TO RELATED APPLICATIONS

This application claims priority to and the benefit of U.S. Provisional Patent Application No. 63/051,823 filed Jul. 14, 2020 and entitled "EFFICIENT REFINEMENT NEURAL NETWORK FOR REAL-TIME GENERIC OBJECT-DETECTION SYSTEMS AND METHODS," which is hereby incorporated by reference in its entirety.

TECHNICAL FIELD

One or more embodiments of the present disclosure relate generally to object detection systems and methods and, more particularly, for example, to object detection architectures and methods that improve processing efficiency and/or detection accuracy.

BACKGROUND

In the field of image processing, there is an ongoing need for efficient and reliable ways to detect and classify objects of interest within a field of view (e.g., a scene) of an imaging device. Conventional object detection systems combine a machine vision imaging component and digital processing components running rules-based image processing software. These systems are used for simple problems like barcode reading or identifying a particular feature of a known object.

Machine leaning systems have been implemented to provide more complex image analysis. In one approach, various images of an object of interest are collected into a training dataset for training a neural network to classify the object. The training images may be generated with a camera capturing images of the object at various angles and in various setting. A training dataset often includes thousands of images for each object classification, and can be time consuming, expensive and burdensome to produce and update. The trained neural network may be loaded on a server system that receives and classifies images from imaging devices on a network. In some implementations, the trained neural network may be loaded on an imaging system, such as a handheld device, with limited processing and memory capabilities.

Simplified machine vision and image classification systems are available for mobile devices, handheld devices, and other systems with limited processing and memory capabilities, but such systems are not capable of running robust trained neural networks and are difficult to adapt to various user scenarios. In practical implementations, limitations on memory, processing and other system resources often lead system designers to produce object detection systems directed to particular tasks. In some designs, a system designer must choose between efficiency and accuracy. In view of the foregoing, there is a continued need for improved object detection and classification solutions, particularly for use in mobile devices.

SUMMARY

The present disclosure is directed to improved neural network architecture and detection methods, which may be suitable, for example, to run on a mobile device with increased processing efficiency and speed over conventional approaches. An improved system includes an efficient backbone network, specially designed for multi-scale feature representation and computation-efficient for large image sizes, and a refined one-stage detection network that combines the backbone network and specialized refinement processing.

In various embodiments, the detection network includes an efficient feature fusion block (FFB), a representation transfer block (RTB) and a two-step cascaded refinement workflow. The FFB is configured to retain both the detailed information from shallow layers and high semantic information from deep layers. The RTB is configured to isolate and to decouple the sub-task networks and the backbone network. The two-step cascaded refinement process is configured to alleviate the burden on the backbone network and resolve extreme class imbalance problems faced by the single-stage detector.

In one embodiment, a high resolution object detection system and method provides accurate, real-time, one-stage processing, and includes a backbone network configured to receive an input image and generate multi-scale feature representations, a feature fusion block configured to fuse the multi-sale feature representations, a plurality of representation transfer modules configured to isolate and decouple sub-task networks and the multi-scale feature representations, and a cascade refinement module configured to process each representation transfer module output to refine predictions. The backbone network generates a plurality of image features corresponding to each of a plurality of image scales and includes a plurality of convolutional layers and a stem block after the first convolutional layer, wherein the stem block improves feature extraction performance. The feature fusion block generates feature outputs for each of a plurality of image scales.

The scope of the disclosure is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the disclosure and their advantages are best understood by referring to the detailed description that follows. It should be appreciated that like reference numerals are used to identify like elements illustrated in one or more of the figures.

DETAILED DESCRIPTION

The present disclosure is directed to improved neural network architecture and object detection methods, which may be suitable, for example, to run on a mobile device with increased processing efficiency and speed over conventional approaches. An improved system includes an efficient backbone, specially designed for multi-scale feature representation and computation-efficient for large image sizes, and a refined one-stage detection network named that combines the backbone networks.

Conventional Convolutional Neural Network (CNN) architectures and detection methods have been adapted to provide object detection on mobile devices. However, there is a gap in the accuracy between lightweight, mobile detectors and state-of-the-art detectors that are available on larger processing systems. The improvements disclosed herein achieve improved accuracy on a lightweight detection device. For example, tests compared the performance of an example implementation of the present disclosure against conventional approaches and demonstrate state-of-the-art detection accuracy (as compared favorably against PASCAL VOC 2007 and MS COCO), with high efficiency than conventional systems (e.g., over 20 times faster than the RetinaNetreal-time object detection method).

Object detection may be used in a variety of implementations, such as computer vision, video surveillance, image analysis, and other implementations. Many object detection systems use a CNN, which may be divided into two groups: (i) two-stage region proposal-based detectors and one-stage detectors. Two-stage detectors include a first stage identifying potential object regions, followed by classification and location processing of the proposed regions in a second stage. One-stage detectors use a single feed-forward convolutional network to directly predict object classes and locations. "You only look once" (YOLO) frames object detection as a regression problem that spatially separates bounding boxes and associates class probabilities. In this way, both object classes and locations can be directly predicted by a convolutional network. SSD improves YOLO in several aspects, including using multi scales of features for prediction and using default boxes and aspect ratios for adjusting varying object shapes. While two-stage approaches generally produce higher accuracy, the one-stage approach generally operates at a higher efficiency. The embodiments disclosed herein include one-stage detection including a two-step cascaded regression, which improves the accuracy and retains the speed advantages of the one-stage detector.

Figure 1:
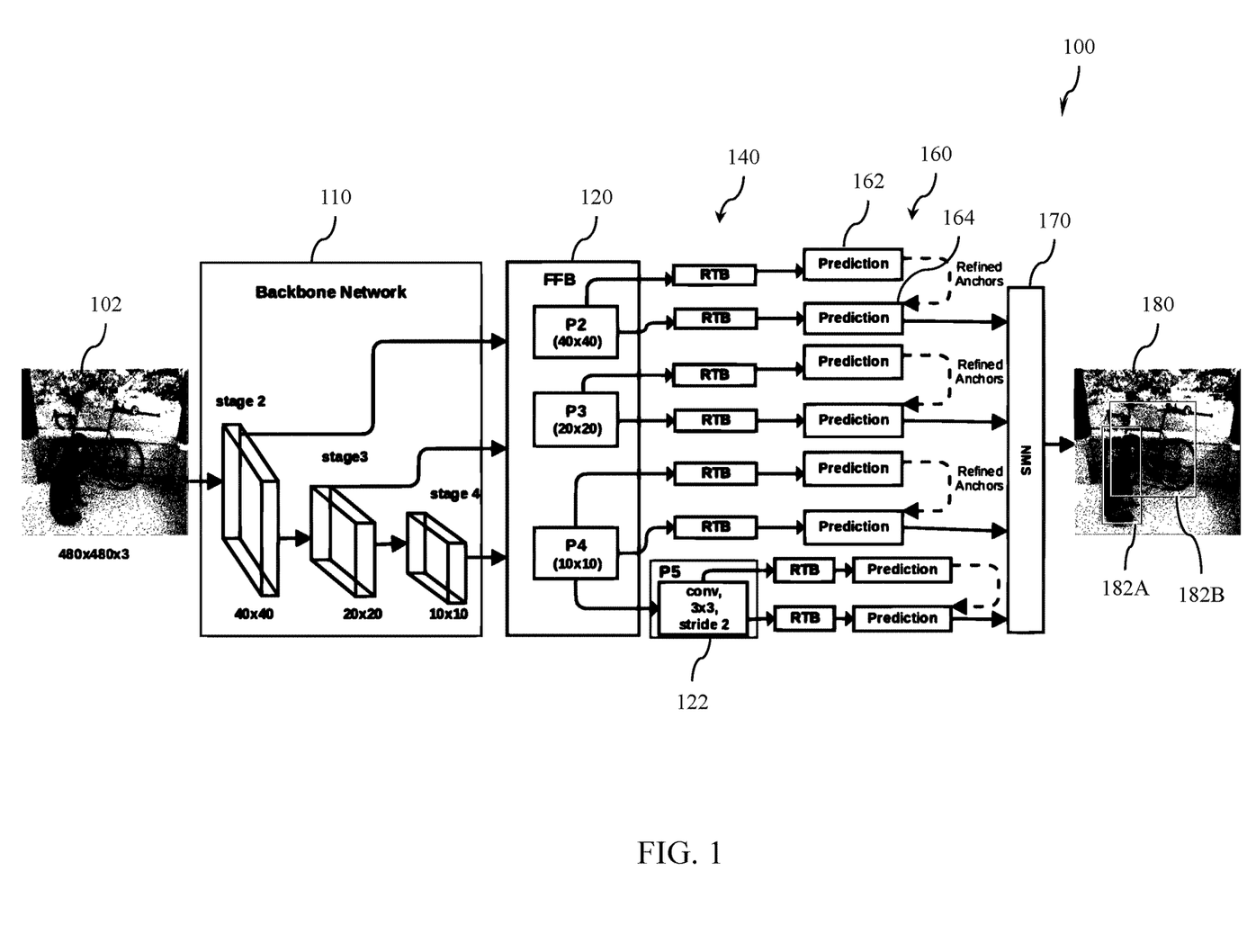
FIG. 1 illustrates an example object detection architecture, in accordance with one or more embodiments of the present disclosure.

Referring to FIG. 1, an example improved neural network architecture for real-time object detection will now be described, in accordance with one or more embodiments. A system 100 is configured to receive an image 102 for object detection and classification. The system 100 is configured to provide efficient and accurate object detection when used on a lightweight device, such as a mobile object detection unit. The system includes a backbone network 110 configured for multi-scale feature representation and to provide efficient computation of large image sizes.

In various embodiments, the backbone network 110 outputs multi-scale image feature data to an efficient feature fusion block 120 (FFB), which is followed by a representation transfer block 140 (RTB) and a two-step cascaded refinement workflow 160. The FFB 120 is configured to extract features from the input image to retain both detailed information from shallow layers and high semantic information from deep layers. The RTB 140 is configured to isolate and to decouple the sub-task networks and the backbone network. The two-step cascaded refinement process 160 is configured to alleviate the burden on the backbone network and resolve extreme class imbalance problems faced by the single-stage detector. The refined predictions are fed to a non-maximum suppression block 170 to resolve the final output image 180, that includes an identification of detected objects (e.g., bounding boxes 182A and 182B encompassing each detected object and/or a corresponding classification).

The illustrated embodiment addresses an increasing need of running CNN models and other machine learning models on mobile devices, which have limited computing power and memory resources. On image classification tasks, example implementations of the present embodiment consistently achieve better accuracy than detectors built with conventional systems (e.g., a VGG backbone), with faster speed. The illustrated embodiment improves the performance of lightweight object detectors in both backbone network design and the detector network design. The efficient backbone network 110 is designed for multi-scale feature representation and is computationally efficient for large size input images. The most popular conventional backbone networks used in object detection were originally designed for image classification tasks. However, using the backbone designed for image classification does not produce the best performance for object detection tasks.

One difference between the two kinds of tasks is that image classification typically uses only the last layer of the network as the feature map for the classification prediction. Object detection, however, uses multiple feature maps for prediction (e.g., the output from stage 2 through stage 4 are all used). For object detection, the feature maps are designed to be sufficiently powerful for label classification and location regression. Another difference is that a large size input is not necessary for image classification tasks since the target object covers a significant portion of the image. On the contrary, the input resolution of an image in object detection tasks should be large enough to ensure the desired performance since target objects in detection tasks can be located anywhere in the image and can be of any size. In view of the foregoing, the backbone network 110 is designed for object detection and multi-scale feature representation and is computationally efficient for high-resolution images.

In some embodiments, the system 100 is an improved variant of an architecture called PeleeNet, which was designed for use on mobile devices. PeleeNet is described in *Pelee: A real-time object detection system on mobile devices*, by Robert J Wang, Xiang Li, and Charles X Ling, 32$^{nd}$ Conference on Neural Information Processing Systems (NeurIPS 2018), which is incorporated by reference herein in its entirety. The system 100 is designed for multi-scale usage and uses dense connectivity patterns and a new dense layer, for both the quantity and quality of each scales' feature. In the illustrated embodiment, each block holds various scale information and the number of features of each stage may be maximized. The system 100 is designed to balance the speed with the accuracy of high-resolution image processing and may use larger images as the input (e.g., 1.5 times larger than previous mobile architectures) than conventional systems, including by aggressively reducing the size of the features. In some embodiments, a stem block is used to improve the feature representation ability. In various experimental embodiments, backbone networks designed in accordance with the teachings of the present disclosure achieved improvements of 1.9 to 3 times faster speed, with improved accuracy that is comparable to more robust systems.

The system 100 incorporates a dense connectivity pattern configured to allow the feature number of each stage to be a large (e.g., in some embodiments as large as possible, while satisfying processing efficiency constraints). In contrast, a traditional CNN network structure reduces the feature size by four times through a stride 2 convolution layer first and a stride 2 pooling layer next. The system 100 uses a 1.5 times larger input dimension and a larger stride of the first convolution layer. A cost-efficient stem block (see, e.g., FIG. 2B, which illustrates an embodiment of a cost-efficient stem block) is included after the first convolution layer to enforce the network to learn better feature representations from the large input dimension. The system 100 further includes a new dense layer (see, e.g., FIG. 3, which illustrates an embodiment of a dense layer) enhances the receptive field of each layers. The network is configured with different growth rates on different dense blocks to further simplify the architecture and improve its computational efficiency.

Figure 2A:
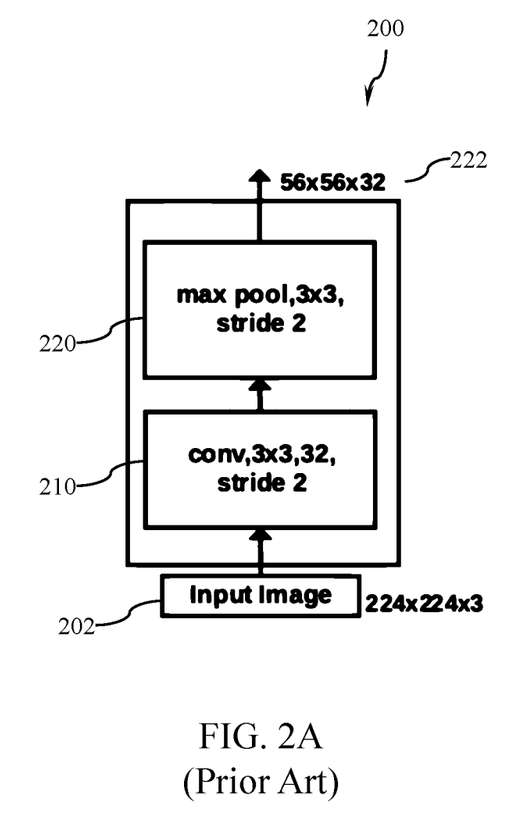
FIG. 2A illustrates a conventional input block in an object detection system.
Figure 2B:
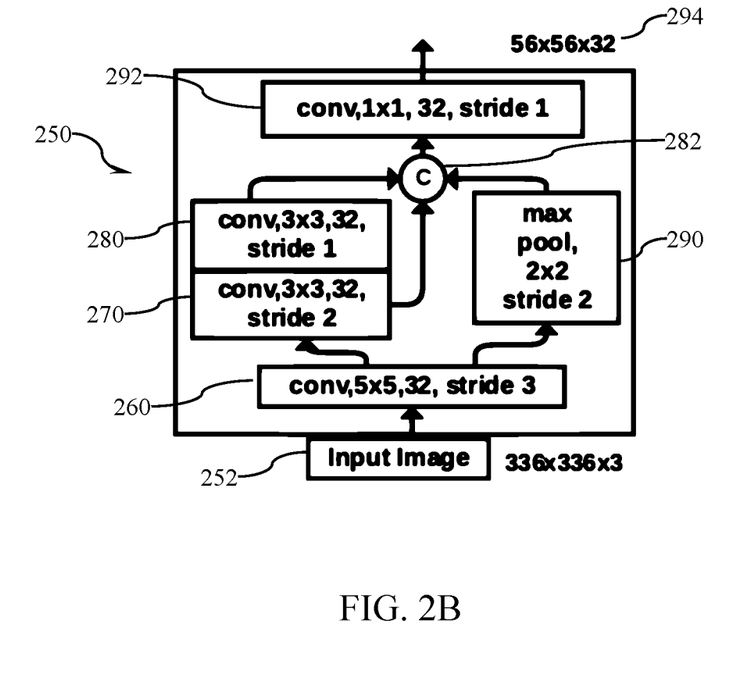
FIG. 2B illustrates an example cost-efficient implementation of a stem block for an object detection neural network, in accordance with one more embodiments of the present disclosure.

Referring to FIGS. 2A and 2B, an embodiment of a cost-efficient stem block 250 will now be described, in accordance with one or more embodiments. As previously discussed, the system incorporates a dense connectivity pattern configured to allow the feature number of each stage to be a large (e.g., as large as possible). A traditional CNN network structure 200 receives an input image 202 and reduces the feature size by four times through a stride 2 convolution layer 210, followed by a stride 2 pooling layer 220 to produce output 222.

The stem block 250, which may be used in the system 100 of FIG. 1, uses a 1.5 times larger input image 252 and a larger stride of the first convolution layer 260 (stride 3). The stride 3 layer 260 is provided to a stride 2 pooling layer 290 on a first processing path, and a stride 2 convolutional layer 270 on a second processing path. The stride 2 layer 270 is followed by a stride 1 convolutional layer 280. The output from the pooling layer 290, the stride 2 layer 270 and the stride 1 layer 280 are concatenated at concatenation block 282 and input to a stride 1 convolutional layer 292 to produce the output 294.

Figure 3A:
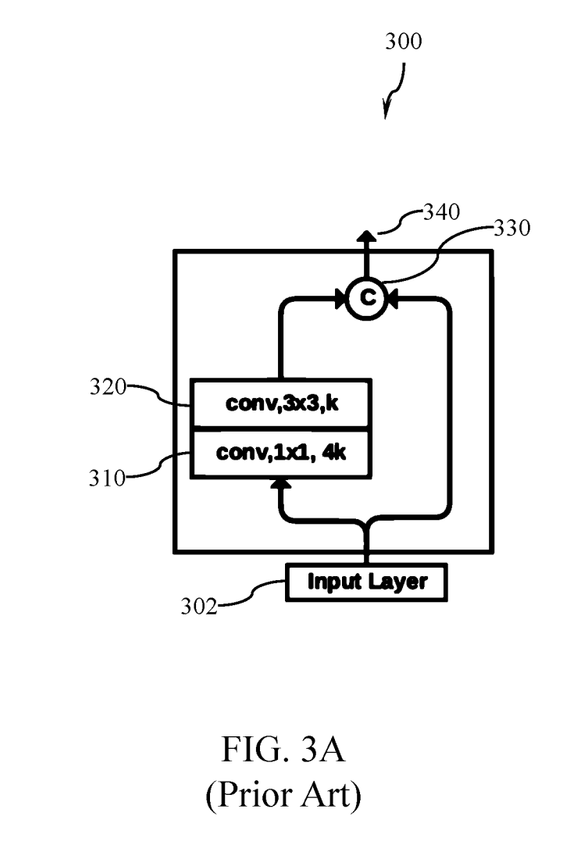
FIG. 3A illustrates a conventional dense layer in an object detection system.
Figure 3B:
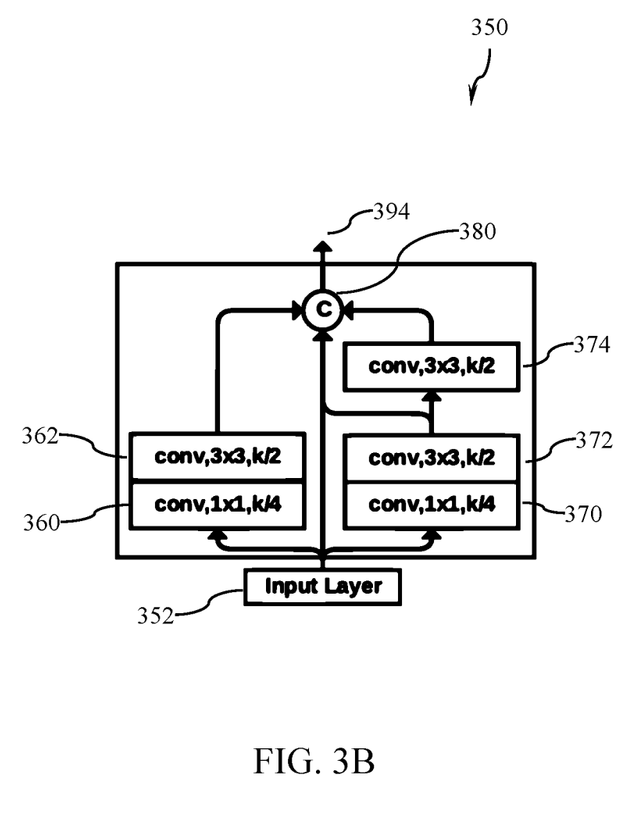
FIG. 3B illustrates an improved dense layer for an object detection neural network, in accordance with one more embodiments of the present disclosure.

Referring to FIGS. 3A and 3B, an example embodiment of an improved dense layer will now be described, in accordance with one or more embodiments. The improved dense layer 350, which may be used in system 100 of FIG. 1, enhances the receptive field of each layers. The network is configured with different growth rates on different dense blocks to further simplify the architecture and improve its computational efficiency. A conventional dense layer 300 is illustrated in FIG. 3A, and includes an input layer 302, which is concatenated at block 330 with the output of a processing path that includes a first convolutional layer 310 followed by a second convolutional layer 320, to produce a dense layer output 340.

The improved dense layer 350 of the present disclosure receives input layer input 352, which is passed through to a concatenation block 380 and two separate processing paths. A first processing path includes a first convolutional layer 360 and a second convolutional layer 362 to produce a first output to concatenation block 380. The second processing path includes a first convolutional layer 370, a second convolutional layer 372 to produce a second output which is provided to the concatenation block 380 and a third convolutional layer 374 to produce a third output which is provided to concatenation block 380. The concatenation block 380 combines the input layer, first output, second output and third output to produce the dense layer output 394.

Figure 4:
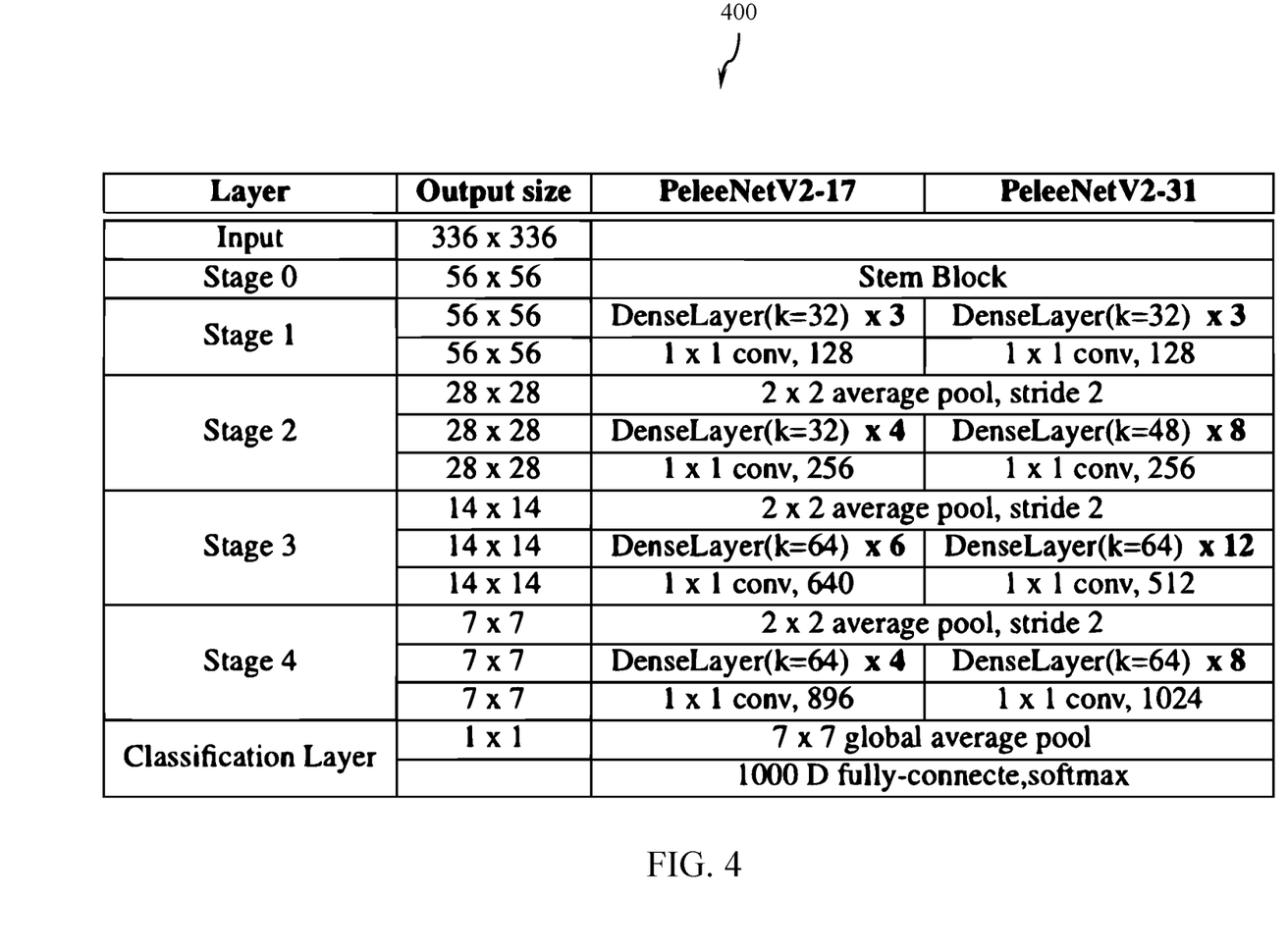
FIG. 4 illustrates example architectures for an object detection neural network, in accordance with one more embodiments of the present disclosure.

Example architectures are illustrated in the table 400 of FIG. 4, in accordance with one or more embodiments of the present disclosure. The architecture shown in FIG. 1 provides refinements over a one-stage detection network and includes the improved backbone network as described. These example architectures in table 400 achieve the state-of-the-art results for high-quality object detection while maintaining the advantage of computational efficiency. These architectures improve the performance of the lightweight object detector significantly, not only achieving a much higher accuracy than other lightweight detectors, but also greater accuracy comparable systems. In one example implementation, the system ran at 71.6 FPS with 80.6 mAP, which is 3-4 times faster than comparable systems.

Figure 5:
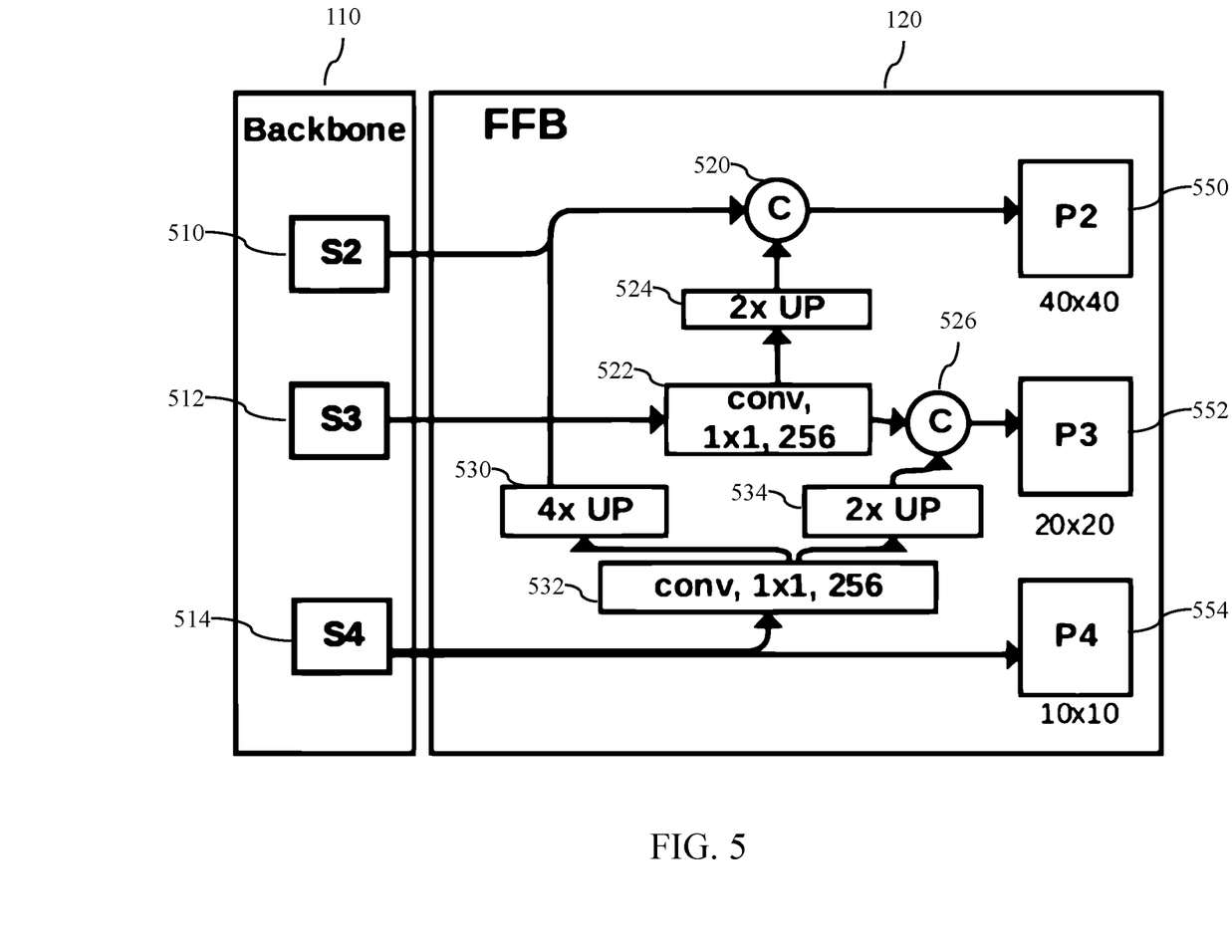
FIG. 5 illustrates an example feature fusion block, in accordance with one more embodiments of the present disclosure.

In various embodiments, improvements to balance speed and accuracy are provided in the feature fusion block, and representation transfer block. Referring to FIG. 5, an example embodiment of the FFB 120 will now be described in greater detail, in accordance with one or more embodiments of the present disclosure. As illustrated, the FFB 120 is implemented through a pyramid network structure to fuse feature maps of different sizes generated from the backbone network 110, including 40×40 stage 2 output 510, 20×20 stage 3 output 512 and 10×10 stage 4 output 514. It will be appreciated that the number of stages and the size of each stage is provided as an example implementation and that modifications to the embodiments disclosed herein are within the scope of the present disclosure. The FFB 120 adopts a late fusion strategy, which aims to ensure that each feature map of the output retains the detailed information learned from the shallow layers of the backbone network and acquires high-level semantic features.

In the illustrated embodiment, the stage 2 output 510 is provided to concatenation block 520 and combined with features of the stage 3 output 512 and stage 4 output 514 to produce an output 550 (40×40 P2 output). The stage 3 output 512 is provided to a 1×1 convolutional layer 522, which is output to concatenation block 526. A copy of the output of convolutional layer 522 is provided to an upsampler 524 to upsample the output for concatenation with the stage 2 output 510. The stage 4 output 514 is provided to output 554 (10×10 P4 output). A copy of the stage 4 output 514 is also provided to convolutional layer 532, which is provided to upsampler 534 to upsample the output for concatenation to produce the output 552 (20×20 output P3) and upsampler 530 to upsample to the output for concatenation with the stage 2 output 510. In some embodiments, a stage 5 output may also be provided, such as stage 5 output 122 (P5 output) of FIG. 1.

Figure 6:
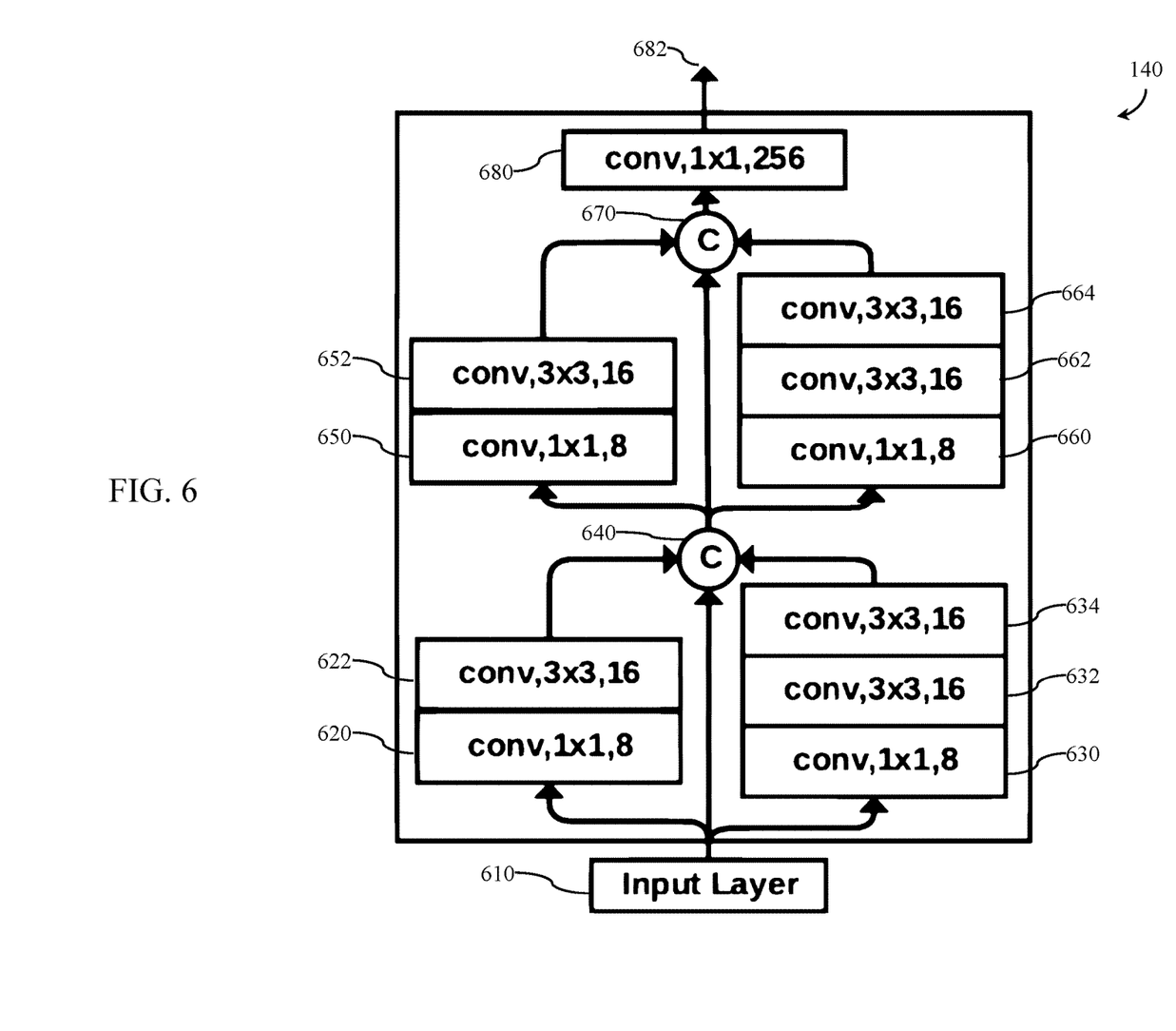
FIG. 6 illustrates an example representation transfer block, in accordance with one more embodiments of the present disclosure.

Referring to FIG. 6, an embodiment of the representation transfer block 140 with now be described, in accordance with one or more embodiments. The RTB module 140 is designed to isolate and decouple the sub-task networks and feature extraction networks, and to encourage features to be passed along the feature extraction network. In the illustrated embodiment, the input layer 610 is provided to concatenation block 640, and two processing paths. A first processing path includes a first convolutional layer 620 followed by a second convolutional layer 622 to produce an output for concatenation block 640. The second processing path includes a first convolutional layer 630, followed by a second convolutional layer 632, which is followed by a third convolutional layer 634 to produce an output for concatenation block 640. The concatenated output is then processed through a similar processing path, including convolutional layers 650 and 652 in a first processing path, and convolutional layers 660, 662, and 664 in a second processing path. The outputs are concatenated at concatenation block 670 and input to a final convolutional layer 680 to produce the output 682.

Referring back to FIG. 1, a two-step cascade refinement process 160 will now be described in further detail, in accordance with one or more embodiments. The two-step cascade refinement process 160 provides an efficient two-step cascade refinement workflow to further improve the performance of the lightweight detector. As illustrated, the RTB structure is added to each sub tasks to convert the raw features to the task-specific feature map. Each output stage of the FFB 120 is output to two RTB processing and prediction paths. In a first processing path, predictions 162 are provided as refined anchors to the prediction processing of the second processing path 164. The output of the second processing paths are then output to the NMS 170.

Figure 7A:
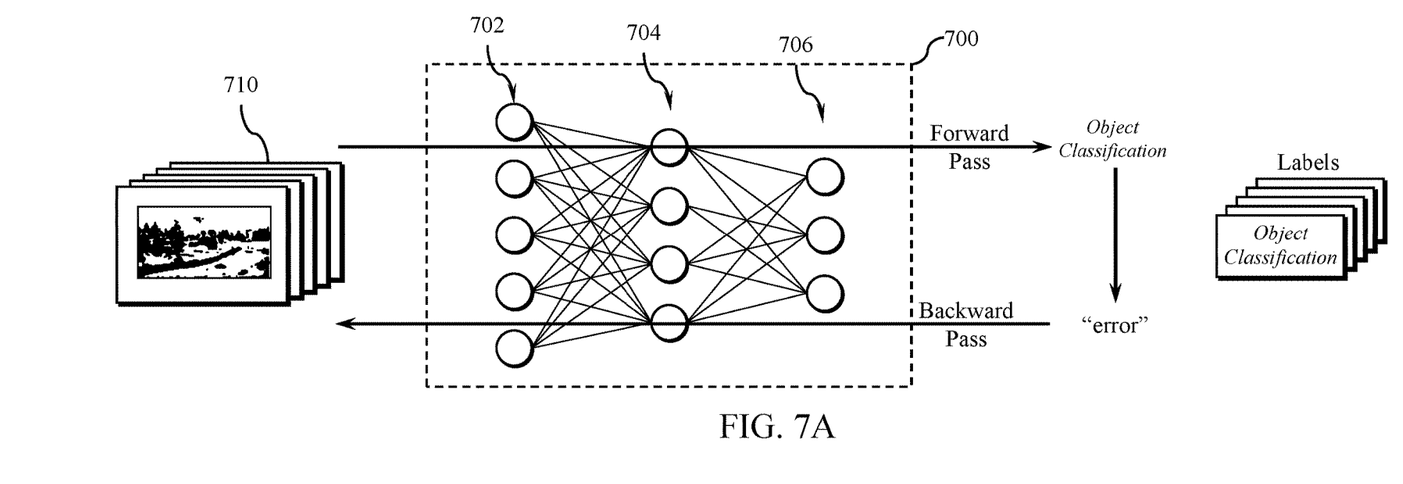
FIG. 7A illustrates an example neural network training process, in accordance with one or more embodiments of the present disclosure.
Figure 7B:
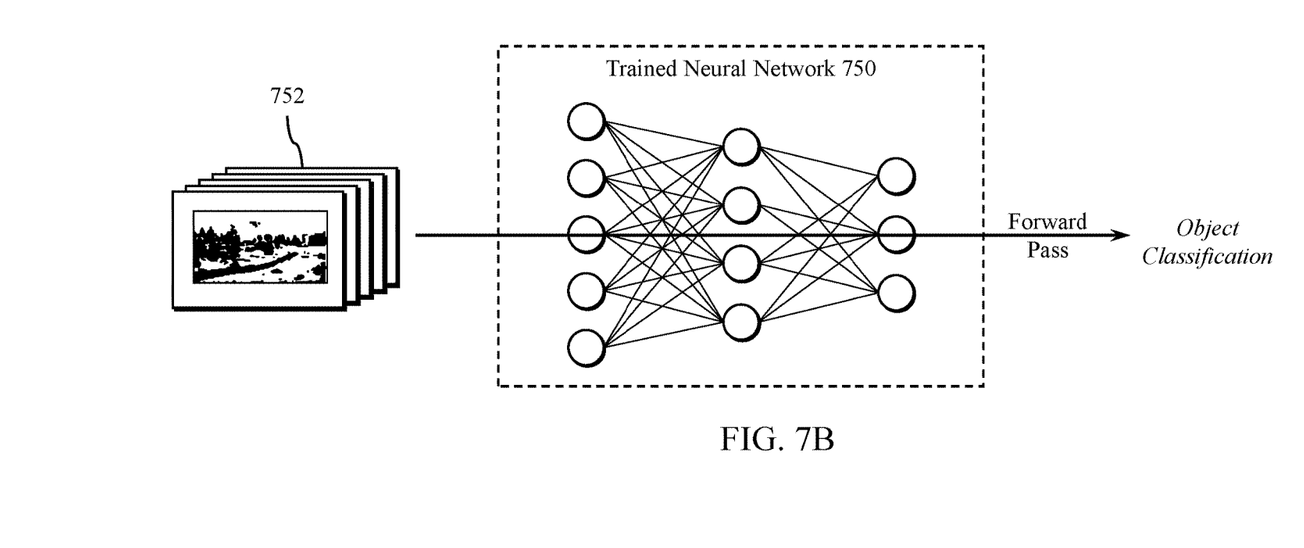
FIG. 7B illustrates an example trained neural network operation, in accordance with one or more embodiments of the present disclosure.

Referring to FIGS. 7A and 7B, an example neural network will now be described. FIG. 7A illustrates a training process for training a neural network 700. The neural network 700 includes at least one input layer 702, at least one hidden layer 704 and at least one output layer 706. The neural network 700 receives a training dataset 710 comprising a series of labeled images representing objects in regions of interest, and outputs an object detection for each image. The training dataset 710 may include images captured from an infrared, visible light, or other type of device that corresponds to input devices and/or data input to the object detection and classification system. In some embodiments, the training dataset 710 includes one or more synthetically generated or modified images. The training dataset 710 may also include other image classification input data (e.g., the output of another trained neural network) that may be available to the system.

For object detection, the images may comprise a region of interest from a captured image that includes an object to be identified or may include the raw image in a one-stage system. In one embodiment, the training starts with a forward pass through the neural network 700 which may include feature extraction through a plurality of convolution layers and pooling layers, followed by object detection in a plurality of fully connected hidden layers and an output layer 706. Next, a backward pass through the neural network 700 may be used to update the weighting parameters for nodes of the neural network 700 to adjust for errors produced in the forward pass (e.g., misclassified objects). In various embodiments, other types of neural networks and other training processes may be used in accordance with the present disclosure.

Referring to FIG. 7B, a trained neural network 750 may then be implemented in a runtime environment to detect objects in the input image 752. The runtime environment may include one or more implementations of the systems and methods disclosed herein, including the architectures disclosed in FIGS. 1-6.

Figure 8:
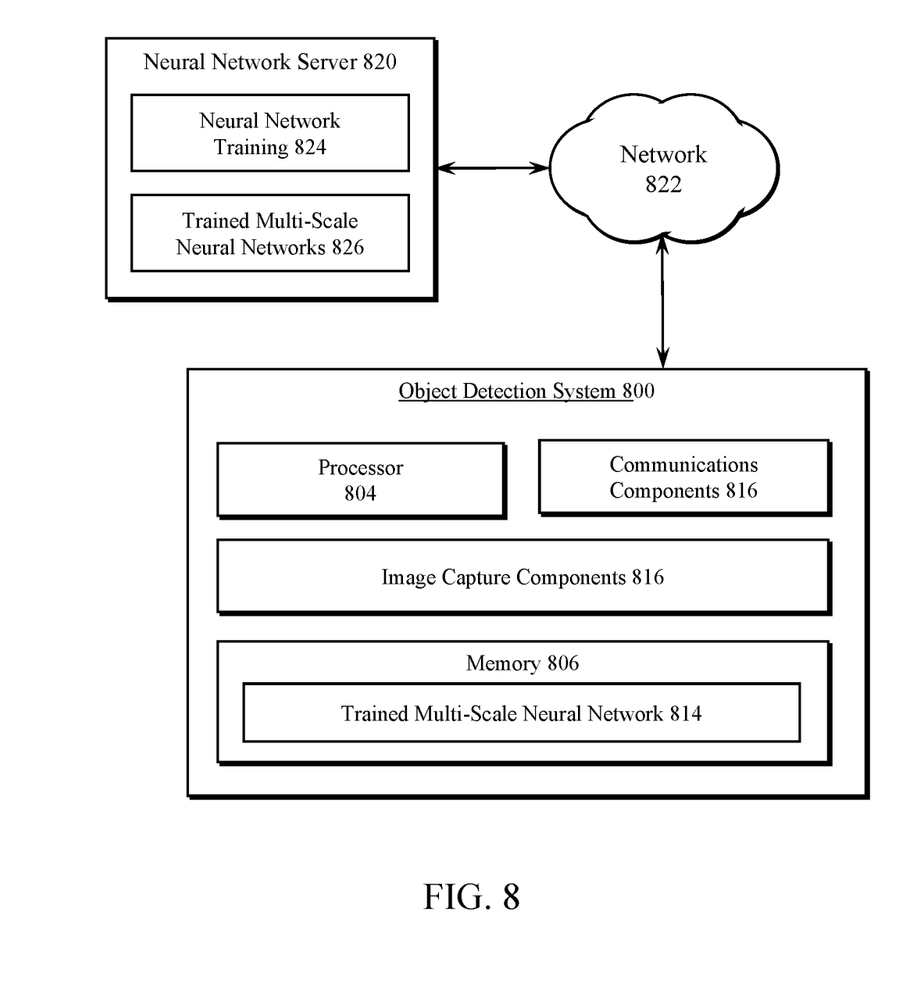
FIG. 8 illustrates an example implementation of an object detection system, in accordance with one or more embodiments of the present disclosure.

An example embodiment of object detection system 800 will now be described with reference to FIG. 8. In the illustrated embodiment, an object detection system 800 includes one or more processors 804 that perform data processing and/or other software execution operations and a memory 806 that stores data and program logic used by the system. The processor 804 may include one or more logic devices, microcontrollers, processors, application specific integrated circuits (ASICs), field programmable gate arrays (FPGAs) or other devices that may be used by the object detection system 800 to execute appropriate instructions, such as the software instructions stored in memory 806, including operating image capture components 816, processing an image through a trained multi-scale neural network 814, and/or other applications. The memory 806 may be implemented in one or more memory devices (e.g., memory components) that store executable instructions, data and information, including image data, video data, audio data, network information. In various embodiments, the object detection system 800 may be implemented as a handheld device, a desktop computer, a mobile computing device such as a mobile phone, tablet, laptop computer or other computing device.

The communications components 816 may include circuitry for communicating with other devices using various communications protocols. In various embodiments, communications components 816 may be configured to communicate over a wired communication link (e.g., through a network router, switch, hub, or other network devices) for wired communication purposes. For example, a wired link may be implemented with a power-line cable, a coaxial cable, a fiber-optic cable, or other appropriate cables or wires that support corresponding wired network technologies. Communications components 816 may be further configured to interface with a wired network and/or device via a wired communication component such as an Ethernet interface, a power-line modem, and/or other appropriate components for wired communication. Proprietary wired communication protocols and interfaces may also be supported by communications components 816.

A neural network server system 820 may be implemented on one or more systems or servers such as an application server that performs data processing and/or other software execution operations for generating, storing, classifying and retrieving images. The neural network training server 820 includes modules for training neural networks 824 and distributing and/or executing trained multi-scale neural networks as described herein. In some embodiments, the components of the neural network server system 820 may be distributed across a communications network, such as communications network 822. The communications network 822 may include one or more local networks such as a wireless local area network (WLAN), wide area networks such as the Internet, and other wired or wireless communications paths suitable for facilitating communications between components as described herein.

In various embodiments, the object detection system 800 may operate as a stand-alone object detection system and/or in communication with one or more devices, such as neural network server 820. In some embodiments, the object detection system 800 may be configured to operate in communication with a server system such as a cloud-based object detection system or may be configured to operate in a dedicated system, such as a video surveillance system that stores video and images captured in real time from a plurality of image capture devices and identifies and classifies objects. The object detection system 800 may be configured to receive one or more images via an image capture component 816 such as a visible light camera, an infrared camera, or other image capture components, via an input port and/or through another component (e.g., image received from another device via communications components 816) and process associated object identification/classification requests.

Figure 9:
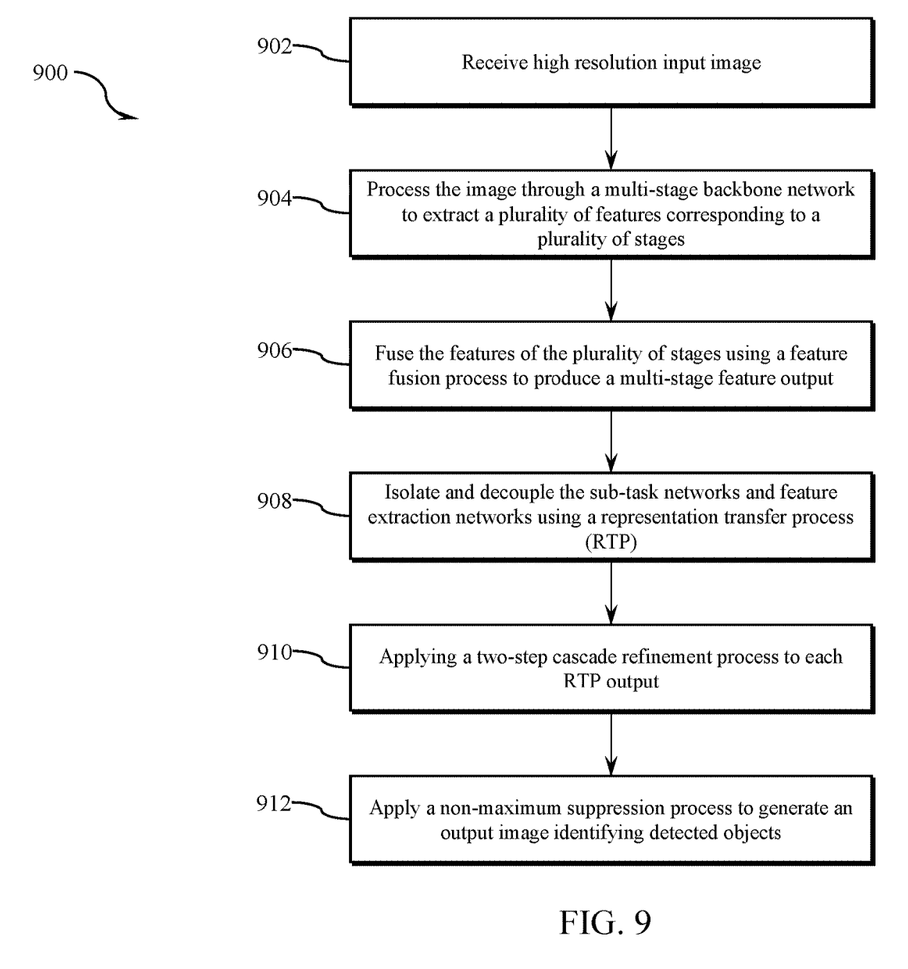
FIG. 9 illustrates an example operation of an object detection system, in accordance with one or more embodiments of the present disclosure.

An example operation of an object detection and classification system using the architecture of the present disclosure will now be described with reference to FIG. 9. The process 900 may be implemented on object detection system that includes one or more processors for executing program logic associated with the process 900. In step 902, object detection system receives a high-resolution input image. As previously discussed, the embodiments disclosed herein can efficiently process images having higher resolution than conventional systems.

In step 904, the image is processed through a multi-stage backbone network to extract a plurality of features corresponding to a plurality of stages. In step 906, the features of the plurality of stages are fused using a feature fusion process to produce a multi-stage feature output. In step 908, the neural network isolates and decouples the sub-task networks and feature extraction networks using a representation transfer process. In step 910, a two-step cascade refinement process is applied to each RTP output. In step 912, non-maximum suppression process is used to generate an output image identifying the detected objects.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
a processor configured to execute program logic to implement a multi-scale object detection neural network comprising:
a backbone network configured to receive an input image and generate multi-scale feature representations of the input image comprising a feature map for each of a plurality of image scales;
a feature fusion block configured to generate feature outputs for each of the plurality of image scales, at least one feature output comprising a fused feature map comprising features extracted at a corresponding image scale by the backbone network, and features corresponding to at least one smaller scale of the plurality of image scales;
a plurality of representation transfer modules configured to isolate and decouple processing of the multi-scale feature representations, wherein each of the feature outputs generated by the feature fusion block is output to two corresponding representative transfer modules;
a cascade refinement module configured to process each representation transfer module output to refine predictions, the cascade refinement module comprising, for each of the two corresponding representation transfer modules, a first processing path configured to generate predictions as refined anchors, and a second processing path configured to generate output predictions, based at least in part, on the refined anchors; and
an output layer configured to process the generated output predictions for each of the plurality of image scales and generate object detection information for the input image.

2. The system of claim 1, wherein the system comprises a one-stage object detection network configured to detect one or more objects in the input image.

3. The system of claim 1, wherein the backbone network is configured to generate a plurality of image features corresponding to each of a plurality of image scales.

4. The system of claim 1, wherein the backbone network is configured to generate image features for each of three image scales in a three-stage image feature extraction process.

5. The system of claim 1, wherein the feature fusion block is configured to generate feature outputs comprising the fused feature map by combining features from the corresponding image scale and features corresponding to each smaller image scale of the plurality of image scales.

6. The system of claim 1, wherein the backbone network further comprises a plurality of convolutional layers and a stem block, after a first convolutional layer, wherein the stem block improves feature extraction performance.

7. The system of claim 1, wherein the system comprises a plurality of dense layers.

8. The system of claim 1, further comprising image capture components configured to capture an image of a scene, and wherein the captured image is provided as the input image.

9. The system of claim 1, wherein the output layer is configured to apply a non-maximum suppression process to generate an output image identifying detected objects.

10. A method comprising:
receiving an input image;
generating, using a backbone network, multi-scale feature representations from the input image comprising a feature map for each of a plurality of image scales;
fusing, using a feature fusion block, the multi-scale feature representations to generate feature outputs for each of the plurality of image scales, at least one feature output comprising a fused feature map comprising features extracted at a corresponding image scale by the backbone network, and features corresponding to at least one smaller scale of the plurality of image scales;
isolating and decoupling, using a plurality of representation transfer modules, processing of the multi-scale feature representations to produce representation transfer module output wherein each of the feature outputs generated by the feature fusion block is processed by two corresponding representative transfer modules; and
processing through a cascade refinement process each representation transfer module output to refine predictions, the cascade refinement process comprising, for each of the two corresponding representation transfer modules, a first processing path generating predictions as refined anchors, and a second processing path generating output predictions, based at least in part, on the refined anchors; and
outputting, through an output layer, object detection information for the input image from the generated output predictions for each of the plurality of image scales.

11. The method of claim 10, wherein generating multi-scale feature representations is performed by a backbone network; and
wherein fusing the multi-scale feature representations is performed by a feature fusion block.

12. The method of claim 10, wherein isolating and decoupling sub-task networks and the multi-scale feature representations is performed by a plurality of representation transfer modules; and
wherein processing through a cascade refinement process each representation transfer module output to refine predictions is performed by a cascade refinement module.

13. The method of claim 10, wherein the method comprises a one-stage object detection process comprising detecting one or more objects in the input image.

14. The method of claim 10, wherein generating multi-scale feature representations comprises combining features of the corresponding image scale and features corresponding to each smaller image scale of the plurality of image scales.

15. The method of claim 10, wherein generating multi-scale feature representations from the input image further comprises generating image features for each of three image scales in a three-stage image feature extraction process.

16. The method of claim 10, wherein generating multi-scale feature representations from the input image further comprises a processing the image through a plurality of convolutional layers and a stem block after a first convolutional layer, wherein the stem block improves feature extraction performance.

17. The method of claim 10, further comprising capturing an image of a scene, and providing the captured image as the input image.

18. The method of claim 10, further comprising applying a non-maximum suppression process to generate an output image identifying detected objects.

* * * * *